Patented Mar. 2, 1943

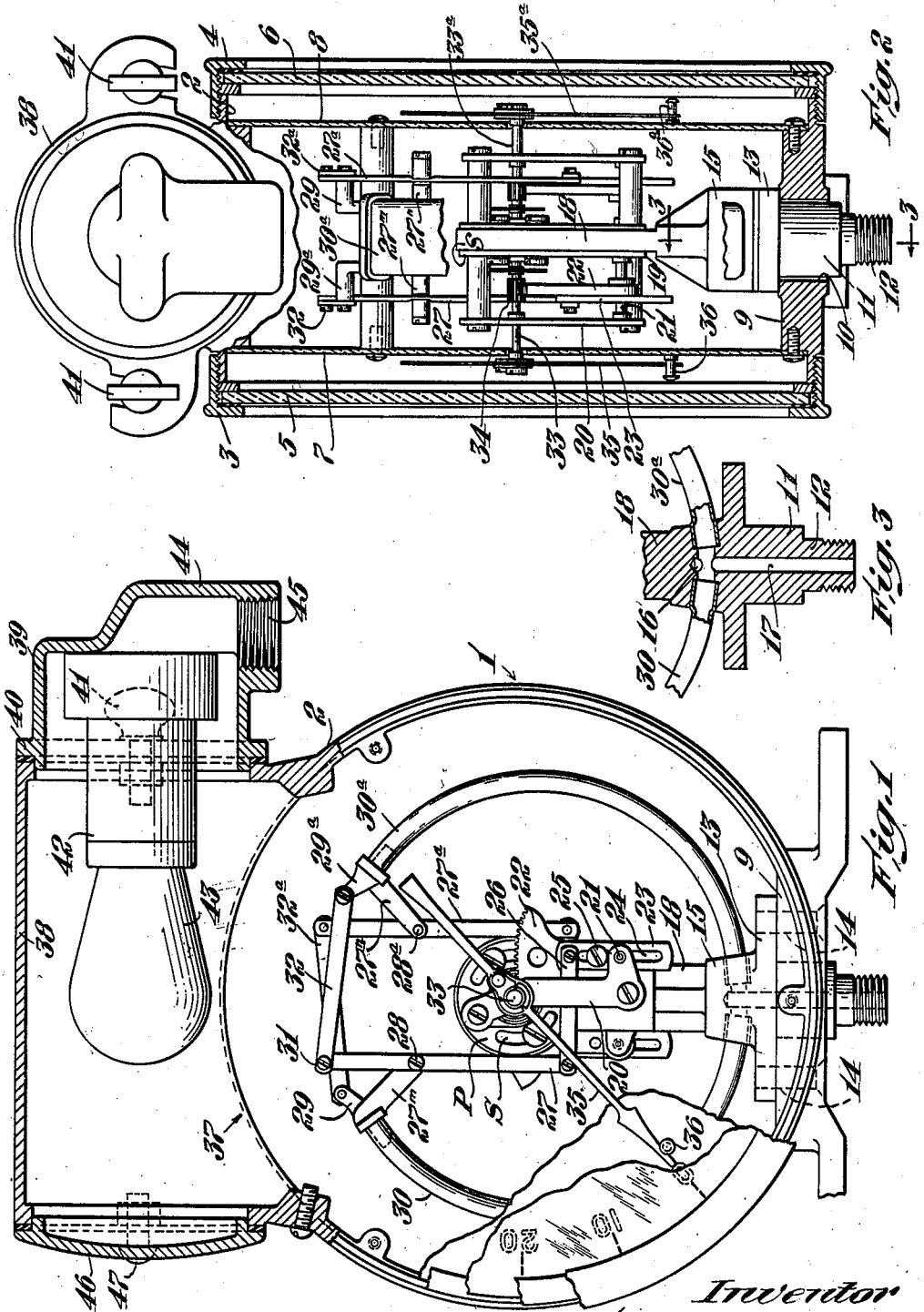

2,312,716

UNITED STATES PATENT OFFICE 2,312,716

PRESSURE GAUGE

Frank H. Hopkins, Fairfield, Conn., assignor to Manning, Maxwell & Moore, Incorporated, New York, N. Y., a corporation of New Jersey Application July 13, 1940, Serial No. 345,321

2 Claims. (Cl. 73—109)

This invention pertains to instruments, for example pressure gauges, dial thermometers or the like, of the kind in which a plurality of graduated dials, each with its own individual index or pointer, are so relatively disposed as to be visible from different directions respectively; for instance the instrument may have a case provided with a dial at its opposite sides (back and front) with the actuating mechanism for both pointers interposed between the dials.

In making such instruments heretofore, it has been usual to employ a single "gauge movement" for translating the motion of the pressure responsive element (Bourdon tube, diaphragm, or the like) into the requisite rotary motion for operating the index or pointer, but such an arrangement makes it difficult properly to calibrate the instrument since relative adjustment of the movement parts, for calibrating one pointer with respect to its dial, does not necessarily accomplish the same object with response to the other dial and pointer.

Since the pointers should both move in the clockwise direction away from the zeros of their respective scales it has been customary, when employing a single movement for actuating both pointers, to interpose a reversing or idler pinion between the movement and one pointer staff, but this necessitates offsetting one pointer staff from the center of its dial.

It has previously been proposed to illuminate the dial of such an instrument by means of a lamp or lamps enclosed within the instrument case, for example in a housing providing an offset chamber at the top or side of the casing proper, and opening into the casing so that the light from the lamp may pass around the edge of the dial and then by reflection from proper surfaces impinge upon and light the front face of the dial.

The present invention has for its object the improvement of instruments of the general class above referred to, and in particular to provide an instrument, such as a pressure gauge, having a plurality of dials, for example two, having independent movements operative to transmit motion from a single pressure responsive element such, for instance, as a Bourdon tube, to the respective pointers thereby to allow independent calibration of the several pointers with respect to their dials. A further object of the invention is to provide a multiple-dial instrument of the kind described, wherein each pointer staff may be disposed centrally of its respective dial and in which no reversing pinion or the like is necessary.

Other and further objects and advantages of the invention will be pointed out hereinafter in the following more detailed description and by reference to the accompanying drawing in which—

Fig. 1 is a front elevation, with certain parts broken away and with certain parts in vertical section, illustrating a multi-dial instrument, for instance a pressure gauge, of the direct reading type, provided with means for illuminating the dials;

Fig. 2 is a vertical section in the vertical plane of the index staffs of the instrument but showing the lamp housing in end elevation; and Fig. 3 is a fragmentary vertical section substantially on the line 3—3 of Fig. 2.

Referring to Figs. 1, 2 and 3 of the drawing which illustrates one desirable embodiment of the invention, the numeral 1 designates the case of a multi-dial pressure gauge, said case having the side wall 2 which, as here illustrated, is substantially cylindrical and which is open at front and rear. The exterior surface of the case, as here illustrated, is externally screw threaded for engagement by internal screw threads provided in the cover rings 3 and 4 respectively. The front cover ring 3 has a central aperture in which is fitted the transparent panel 5, while the rear cover ring 4 is furnished with the transparent panel 6. A dial 7 is arranged within the case behind the panel 5, and a second dial 8 is arranged within the case behind the panel 6. While the gauge caps or covers here illustrated are of the usual type, including an outer ring which supports an independent transparent panel, it is to be understood that caps or covers of other type may be employed if desired.

The lower part of the case is provided with a platform portion 9 through which is an aperture 10 (Fig. 2) for the accommodation of the stem portion 11 of the movement support. The stem 11 terminates in the externally screw-threaded nipple 12 to which the pressure supply conduit may be attached. The stem 11 is integrally joined to an attaching flange 13 which rests upon the upper surface of the platform 9, to which it is secured by means of screws 14. A boss 15 projects upwardly from the flange 13 and has an internal chamber 16 (Fig. 3) which communicates with the inner end of a passage 17 which leads down through the stem 11 and nipple 12. To the upper part of the boss 15 is secured the lower end of a movement supporting standard 18. This standard, as illustrated in Fig. 2, is preferably narrow in the front-to-rear direction, but has a wide upper portion designed to form a plate-like support to which the gauge movements are secured. The standard 18 is interposed between the front and rear gauge movements. The gauge movements are substantially identical in construction, but are placed back to back, so that the index or pointer of each gauge movement turns in a clockwise direction when viewed through the corresponding transparent panel 5 or 6 respectively.

Referring to Fig. 1, the front movement is illustrated as comprising the rear supporting plate 19 whose upper portion is of substantially circular contour as shown at P, Fig. 1, said circular portion having arcuate slots S, concentric with the index staff, and which receive screws by means of which the rear plate is secured to the standard 18. By loosening these screws, the rear plate, together with the other parts of the movement carried thereby, may be swung about the axis of the index staff in adjusting the initial position of the parts.

The front movement frame also comprises the plate 20 which is parallel to the plate 19 and is held in spaced relation thereto by means of rigid posts as is customary in the building of gauge movement frames. The front and rear plates provide bearings for the sector staff 21 upon which is fixed the sector 22. An actuating arm 23, having an elongate slot 24, is associated with the sector 22. The sector staff passes through the slot 24 and a screw 25 also passes through this slot and engages a threaded opening in the sector. Thus the effective length of the actuating arm may be varied. To the upper end of the arm 23 is pivotally secured a link 26 which is pivotally united to the lower end of a lever 27 which is pivoted at 28 to a forwardly directed bracket arm 27$^m$ secured to the free end or tip of the Bourdon tube 30. The lever 27 has a relatively short arm, extending above the pivot 28, to the upper end of which is pivoted, at 31, one end of a link 32 whose opposite end is secured to a forwardly directed bracket arm 29$^a$ attached to the free end or tip of the second Bourdon tube 30$^a$. The open ends of the Bourdon tubes 30 and 30$^a$ are seated in bores in the boss 15 and the interior of each tube communicates with the pressure chamber 16 so that both tubes are exposed internally to the same fluid pressure.

The rear gauge movement is substantially like the front movement, but has its sector actuating lever 27$^a$ pivotally united at its upper end to a link 32$^a$ whose opposite end is pivotally united to a rearwardly directed bracket 29 carried by the tip of the tube 30. The lever 27$^a$ is pivoted at 28$^a$ to a rearwardly directed bracket 27$^n$ carried by the tip of the tube 30$^a$. The link and lever arrangements just described multiply the motion of the tips of the Bourdon tubes, so that tubes of less length than usual may be employed. Thus two tubes may be used in a case not greatly exceeding cases commonly used to house a single tube and movement.

The index staffs 33 and 33$^a$ of the respective gauge movements are in axial alignment, but by reason of the back-to-back location of the movements, and the arrangement of the link and lever connections these two staffs turn in opposite directions, but to the same amount. The pointers or indexes 35 and 35$^a$ are fixed to the outer ends of the respective index staffs and in front of their respective dials, and these dials are provided with stop pins 36 and 36$^a$ respectively to prevent reverse movement of the indexes beyond the zero points of the respective scales. The dials are provided with graduated scales, the graduations being arranged for direct reading, that is to say, movement of the index or pointer begins at the actual zero of pressure, the movement of the pointer or index over the scale being in direct ratio to the increase in pressure in the chamber 16.

The upper central part of the case of the instrument is provided with an opening 37, Fig. 1, over which is arranged a lamp housing 38. As here illustrated, this housing is of substantially cylindrical elongate contour and is integrally joined to the wall 2 of the casing, the lamp chamber or space within the housing 38 opening into the space between the two dials 7 and 8.

The opposite ends of this housing 38 are open but normally closed by means of removable and interchangeable end caps. The end cap 39 has a flange 40 which fits against the end of the housing, and the cap is removably held in place by means of wing-bolts 41. The cap 39 is properly shaped and arranged to provide a chamber for the reception of the base of a lamp socket 42, designed to receive a lamp 43 disposed directly above the center of the gauge case. The end member 39 is preferably provided with a downward extension 44 having an internally screw-threaded opening 45 designed to receive the threaded end of a suitable conduit through which electrical conducting wires may enter and be connected to the lamp socket.

The opposite end of the housing 38 is closed by a cap 46 which is normally held to the housing by screws 47.

The dials 7 and 8, are of light transmitting material, preferably translucent, for instance frosted glass, so that light from the space between the dials may pass outwardly through the dials and thus provide a substantially uniform illumination for the scales carried by the exposed surfaces of the dials. As the lamp is housed within the opaque housing 38, its light cannot escape directly forward so as to dazzle the eyes of the observer and thus the illuminated dials are very easy to read. Moreover, the arrangement provides for the use of a lamp of substantial size, so that the chamber between the dials may be flooded with light, thus insuring sufficient intensity of illumination at all points on the dial. The illumination feature forms the subject matter claimed in applicant's Patent No. 2,283,994 issued May 26, 1942.

While one desirable embodiment of the invention has herein been illustrated and described, it is to be understood that the invention is not necessarily limited to the precise arrangements herein described, but is to be regarded as broadly inclusive of any and all equivalent constructions such as fall within the scope of the appended claims.

I claim:

1. An instrument of the class described wherein a pair of spaced, coaxial, graduated, oppositely facing dials are housed within a casing which is open at its opposite sides and which also houses a pair of movable indexes each cooperable with one of said dials, a pair of gauge movements, one for moving each index, and a pair of Bourdon tubes, each tube having a rigid bracket fixed to its tip, characterized in having a pair of levers, one lever being pivotally supported by each bracket, a pair of links, one link having one of its ends pivotally connected to one bracket and the other link having one of its ends pivotally connected to the other bracket, each of said links, respectively, having its opposite end pivotally connected to that lever which is supported by the other bracket, and a second pair of links, one of said latter links connecting each of the levers, respectively, to one of the movement mechanisms, respectively, whereby both Bourdon tubes cooperate in actuating each movement mechanism.

2. An instrument of the class described wherein a pair of spaced, coaxial, graduated, oppositely facing dials are housed within a casing which is open at its opposite sides and which also houses a pair of movable indexes each cooperable with one of said dials, a pair of substantially identical movement mechanisms, one for moving each index, and a pair of Bourdon tubes, characterized in that the movement mechanisms are back-to-back and spaced apart from front to rear and that the longitudinal axes of the two Bourdon tubes are disposed substantially in the mid-plane between the dials, each tube having a bracket fixed to its tip, each bracket having a pair of rigid arms, one arm of each bracket extending forwardly and the other arm of each bracket extending rearwardly, a pair of levers, one pivotally supported, at a point between its ends, to the forwardly directed arm of one bracket and the other pivotally supported, at a point between its ends, to the rearwardly directed arm of the other bracket, a pair of links, one pivoted at one end to the forwardly directed arm of the first of said brackets and the other link being pivoted at one end to the rearwardly directed arm of the second bracket, the opposite end of each of the respective links being pivotally secured to a corresponding arm of that lever which is supported by the other bracket, the other arms of each of the two levers being connected, each by one of a second pair of links, respectively, to the respective movement mechanisms whereby both Bourdon tubes cooperate in actuating each movement mechanism.

FRANK H. HOPKINS.